(12) United States Patent
Koetas et al.

(10) Patent No.: US 7,396,497 B2
(45) Date of Patent: Jul. 8, 2008

(54) METHOD OF FORMING A POLISHING PAD HAVING REDUCED STRIATIONS

(75) Inventors: Joseph P. Koetas, Landenberg, PA (US); Alan E. Leviton, Newburyport, MA (US); Kari-Ell Norton, Holtwood, PA (US); Samuel J. November, Newtown, PA (US); Malcolm W. Robertson, Aston, PA (US); Alan H. Saikin, Landenberg, PA (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 797 days.

(21) Appl. No.: 10/956,847

(22) Filed: Sep. 30, 2004

(65) Prior Publication Data

US 2006/0066001 A1    Mar. 30, 2006

(51) Int. Cl.
B28B 11/18 (2006.01)

(52) U.S. Cl. .................. 264/162; 264/161; 264/109; 264/118; 264/51; 451/526; 451/41; 451/59

(58) Field of Classification Search ............... 264/162, 264/161, 109, 118, 51, 54; 451/526, 41, 451/59, 528

See application file for complete search history.

(56) References Cited

U.S. PATENT DOCUMENTS

| | | | |
|---|---|---|---|
| 5,489,233 A | 2/1996 | Cook et al. | |
| 5,538,162 A * | 7/1996 | Reh et al. | 222/63 |
| 5,578,362 A | 11/1996 | Reinhardt et al. | |
| 6,022,268 A | 2/2000 | Roberts et al. | |
| 6,149,506 A | 11/2000 | Duescher | |
| 6,328,634 B1 | 12/2001 | Shen et al. | |
| 6,362,107 B1 | 3/2002 | Shiro et al. | |
| 6,454,634 B1 | 3/2002 | Shiro et al. | |
| 6,514,301 B1 | 2/2003 | Lombardo | |
| 6,612,733 B2 * | 9/2003 | Schmidt et al. | 366/310 |
| 6,620,537 B2 | 9/2003 | Struthers et al. | |
| 6,627,671 B1 | 9/2003 | Kihara et al. | |
| 6,705,934 B1 | 3/2004 | Shiro et al. | |
| 6,986,705 B2 * | 1/2006 | Preston et al. | 451/526 |
| 7,147,034 B2 * | 12/2006 | Clayton | 164/456 |
| 7,275,856 B2 | 10/2007 | Koetas et al. | |
| 7,275,928 B2 | 10/2007 | Kolesar et al. | |
| 2006/0108701 A1 | 5/2006 | Saikin et al. | |
| 2006/0226567 A1 | 10/2006 | James et al. | |
| 2006/0226568 A1 | 10/2006 | James et al. | |

(Continued)

*Primary Examiner*—Mark Halpern
(74) *Attorney, Agent, or Firm*—Edwin Oh; Thomas S. Deibert

(57) ABSTRACT

The present invention provides a method of forming a chemical mechanical polishing pad, comprising providing a tank with polymeric materials and providing a storage hopper with microspheres having an initial bulk density, wherein the storage hopper further comprises a porous membrane provided over a plenum. The method further provides the steps of connecting a fluidizing gas source to the plenum through a gas inlet line and fluidizing the microspheres and reducing the initial bulk density by feeding gas into the plenum. In addition, the method further provides the steps of providing a delivery system for delivering the polymeric materials and the microspheres to a mixer, forming a mixture of the polymeric materials and the microspheres, pouring the mixture into a mold to form a molded product and cutting the molded product into the polishing pad.

6 Claims, 5 Drawing Sheets

U.S. PATENT DOCUMENTS

| | | |
|---|---|---|
| 2006/0228439 A1 | 10/2006 | James et al. |
| 2007/0034614 A1 | 2/2007 | McClain et al. |
| 2007/0066196 A1 | 3/2007 | Saikin |
| 2007/0210491 A1 | 9/2007 | Saikin et al. |
| 2007/0235904 A1 | 10/2007 | Saikin et al. |

* cited by examiner

METHOD OF FORMING A POLISHING PAD HAVING REDUCED STRIATIONS

BACKGROUND OF THE INVENTION

The present invention relates to polishing pads for chemical mechanical planarization, and in particular, relates to polishing pads having reduced striations. Further, the present invention relates to apparatuses and methods for forming polishing pads having reduced striations.

In the fabrication of integrated circuits and other electronic devices, multiple layers of conducting, semiconducting and dielectric materials are deposited on or removed from a surface of a semiconductor wafer. Thin layers of conducting, semiconducting, and dielectric materials may be deposited by a number of deposition techniques. Common deposition techniques in modem processing include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the wafer becomes nonplanar. Because subsequent semiconductor processing (e.g., metallization) requires the wafer to have a flat surface, the wafer needs to be planarized. Planarization is useful in removing undesired surface topography and surface defects, such as rough surfaces, agglomerated materials, crystal lattice damage, scratches, and contaminated layers or materials.

Chemical mechanical planarization, or chemical mechanical polishing (CMP), is a common technique used to planarize substrates, such as semiconductor wafers. In conventional CMP, a wafer is mounted on a carrier assembly and positioned in contact with a polishing pad in a CMP apparatus. The carrier assembly provides a controllable pressure to the wafer, pressing it against the polishing pad. The pad is moved (e.g., rotated) relative to the wafer by an external driving force. Simultaneously therewith, a chemical composition ("slurry") or other polishing solution is provided between the wafer and the polishing pad. Thus, the wafer surface is polished and made planar by the chemical and mechanical action of the pad surface and slurry.

Reinhardt et al., U.S. Pat. No. 5,578,362, discloses an exemplary polishing pad known in the art. The polishing pad of Reinhardt comprises a polymeric matrix having microspheres dispersed throughout. Generally, the microspheres are blended and mixed with a liquid polymeric material, for example, in a mass flow feed delivery system, and transferred to a mold for curing. The molded article is then cut to form polishing pads. Unfortunately, polishing pads formed in this manner may have unwanted striations.

Striations are the result of variations in bulk density of the microspheres in the polymeric matrix. In other words, different areas of higher and lower concentrations of the microspheres are present in the polymeric matrix. For example, in the polishing pad of Reinhardt, the low true density of the microspheres inhibits the free or uninterrupted flow of the microspheres in the mass flow feed delivery system. Consequently, the microspheres tend to "cluster" together in varying degrees, at different points in the delivery process (i.e., causing variations in bulk density or striations). These striations are unwanted because they may cause unpredictable, and perhaps, detrimental, polishing performances from one polishing pad to the next. Moreover, these striations may negatively affect polishing performances within the pad itself.

Typically, these striations were minimized by utilizing combinations of gravity, various storage hopper designs, mechanical forces (e.g., vibration), and manual, periodic-sample measuring, adjusting process conditions and re-measuring to determine bulk density. However, prior art apparatuses and methods are inadequate and inefficient at controlling bulk density to meet the ever increasing demands of the CMP industry.

Hence, what is needed is a polishing pad having reduced striations. Moreover, what is needed is an apparatus and an efficient method of forming a polishing pad having reduced striations.

STATEMENT OF THE INVENTION

In a first aspect of the present invention, there is provided a method of forming a chemical mechanical polishing pad, comprising: providing a tank with polymeric materials; providing a storage hopper with microspheres having an initial bulk density, wherein the storage hopper further comprises a porous membrane provided over a plenum; connecting a fluidizing gas source to the plenum through a gas inlet line; fluidizing the microspheres and reducing the initial bulk density by feeding gas into the plenum; providing a delivery system for delivering the polymeric materials and the microspheres to a mixer; forming a mixture of the polymeric materials and the microspheres; pouring the mixture into a mold to form a molded product; and cutting the molded product into the polishing pad.

DETAILED DESCRIPTION OF THE INVENTION

The present invention provides a striation reduced polishing pad. Further, the present invention provides a novel apparatus and method for forming a striation reduced polishing pad. In particular, the present invention utilizes a unique bulk density control unit to reduce the striations in the polishing pad. The bulk density control unit comprises, a novel storage hopper for storing microspheres. The storage hopper further comprises a porous membrane provided over a plenum and a fluidizing gas source connected to the plenum through a gas inlet line. The gas is fed into the plenum, which permeates through the porous membrane and fluidizes or reduces the initial bulk density of the microspheres in the storage hopper. Preferably, the initial bulk density of the microspheres are reduced by at least 20 percent. This reduction in initial bulk density allows for the consistent, uninterrupted flow of the microspheres and results in less variations in bulk density, which in turn, reduces striations in the novel polishing pad. As defined herein, "initial bulk density" is the true density of the microspheres.

Figure 1:
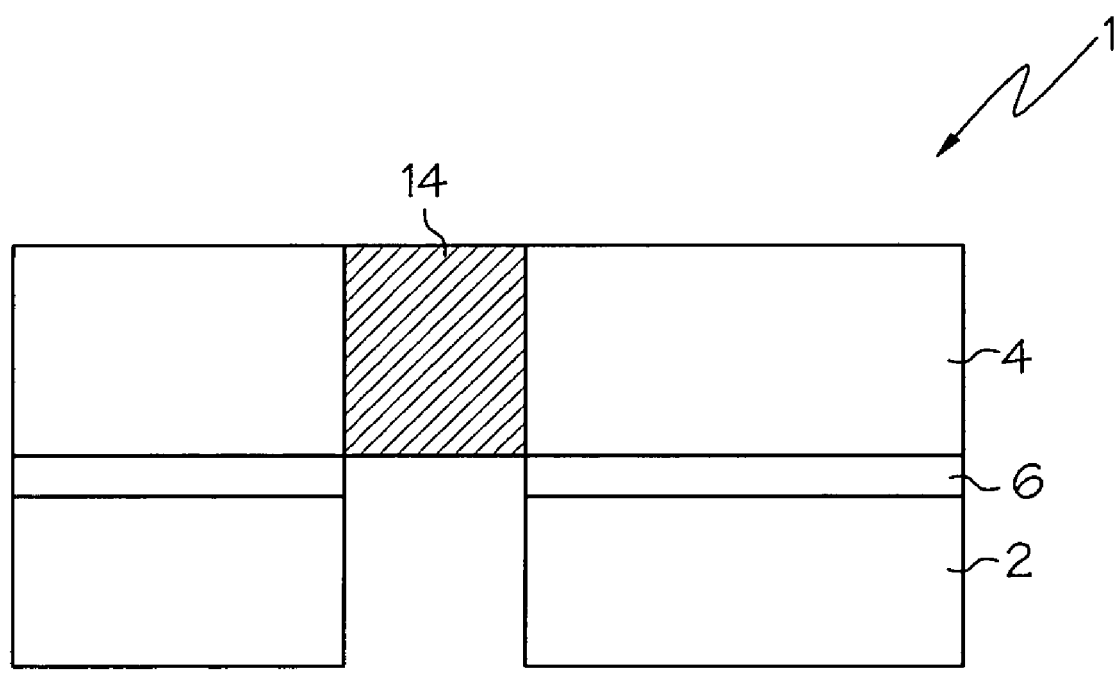
FIG. 1 illustrates a polishing pad of the present invention having reduced striations.

Referring now to FIG. 1, a polishing pad 1 of the present invention is shown. Polishing pad 1 comprises a polishing layer or pad 4, and an optional bottom layer or pad 2. The bottom layer 2 may be made of felted polyurethane, such as SUBA-IV™ pad manufactured by Rohm and Haas Electronic Materials CMP Inc. ("RHEM"), of Newark, Del. The polishing pad 4 may comprise a polyurethane pad (e.g., a pad filled with microspheres), such as, IC 1000™ pad by RHEM. Polishing pad 4 may optionally be texturized as desired. A thin layer of pressure sensitive adhesive 6 may hold the polishing pad 4 and the bottom layer 2 together. The adhesive 6 may be commercially available from 3M Innovative Properties Company of St, Paul, Minn. Polishing layer 4 may have a transparent window 14 provided therein to facilitate end-point detection.

Figure 2:
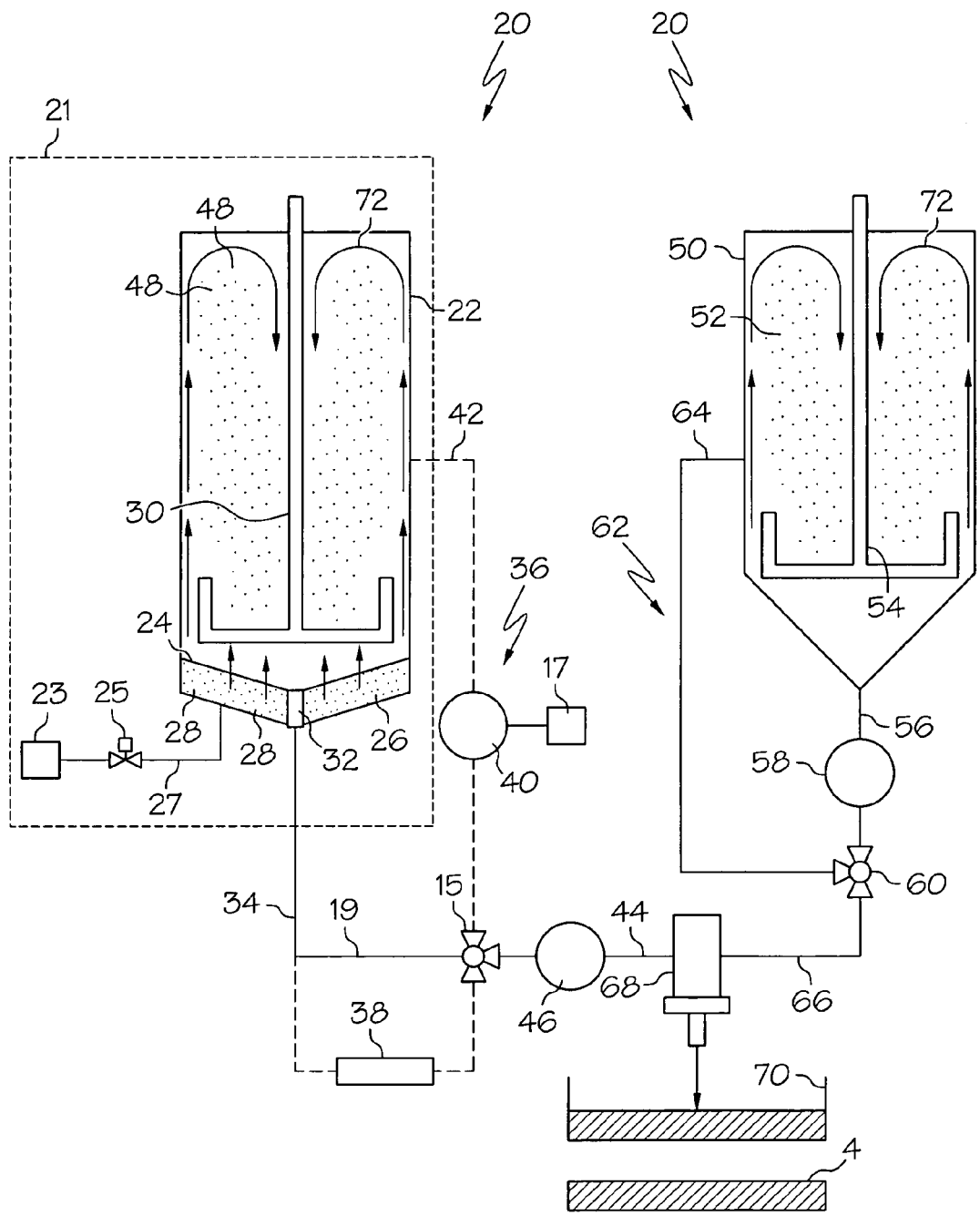
FIG. 2 illustrates an apparatus for forming the polishing pad of the present invention.

Referring now to FIG. 2, a polishing pad apparatus 20 for forming the polishing pad 4 of the present invention is shown. The apparatus 20 comprises a storage hopper 22 sized to hold a sufficient quantity of microspheres or microelements 48. The storage hopper 22 is provided with a porous membrane 24 located at the bottom of the hopper 22, positioned above the plenum 26. Preferably, at least a portion of the polymeric microspheres are generally flexible. Suitable polymeric microspheres include inorganic salts, sugars and water-soluble particles. Examples of such polymeric microspheres (or microelements) include polyvinyl alcohols, pectin, polyvinyl pyrrolidone, hydroxyethylcellulose, methylcellulose, hydropropylmethylcellulose, carboxymethylcellulose, hydroxypropylcellulose, polyacrylic acids, polyacrylamides, polyethylene glycols, polyhydroxyetheracrylites, starches, maleic acid copolymers, polyethylene oxide, polyurethanes, cyclodextrin and combinations thereof (e.g., Expancel™ from Akzo Nobel of Sundsvall, Sweden). The microspheres 48 may be chemically modified to change the solubility, swelling and other properties by branching, blocking, and crosslinking, for example. Preferably, the microspheres 48 has a mean diameter that is less than 150 μm, and more preferably a mean diameter of less than 50 μm. Most Preferably, the microspheres 48 has a mean diameter that is less than 15 μm. Note, the mean diameter of the microspheres may be varied and different sizes or mixtures of different microspheres 48 may be impregnated in the polymeric material 52 as desired. A preferred material for the microsphere is a copolymer of acrylonitrile and vinylidene chloride.

Further, a helical agitator 30 is provided in the storage hopper 22 and positioned above the surface of the porous membrane 24. For example, the helical agitator 30 may be provided 0.0127 m to 0.457 m above the surface of the porous membrane 24. Preferably, the helical agitator 30 may be provided 0.0127 m to 0.4 m above the surface of the porous membrane 24. Most preferably, the helical agitator 30 may be provided 0.0127 m to 0.0381 m above the surface of the porous membrane 24. The rotational direction and speed of the helical agitator 30 is predetermined in order to facilitate the upward, vertical movement 72 of the microspheres 48 along the outer wall of the hopper 22 in conjunction with the downward, axial flow along the shaft of the agitator 30. For example, the speed of the helical agitator 30 may be set to a range of 5 to 10 rpm.

In addition, the apparatus 20 further comprises a tank 50 to hold polymeric materials 52. Note, any number of hoppers and tanks may be utilized in the present invention. Further, the apparatus 20 comprises a mixer 68 for creating a mixture of the polymeric materials 52 and microspheres 48 from the first and second delivery lines 66, 44. The storage hopper 22, including the porous membrane 24 provided over the plenum 26, helical agitator 30 and fluidizing gas source 23, together comprise a bulk density control unit 21.

Advantageously, the porous membrane 24 may slope downward away from the outer walls of the hopper 22 to help facilitate the free flow of the microspheres. Preferably, the porous membrane 24 may have a shallow angle of 0 degrees to 60 degrees, sloping downward away from the walls of the hopper 22. More preferably, the porous membrane 24 may have a shallow angle of 0 degrees to 30 degrees, sloping downward away from the walls of the hopper 22. Most preferably, the porous membrane 24 may have a shallow angle of 0 degrees to 15 degrees, sloping downward away from the walls of the hopper 22. In addition, the porous membrane 24 contains a discharge port 32 that passes through the plenum 26 and connects to the feed line 34. Further, the feed line 34 may connect to pump 46, then into the mixer 68 by direct feed line 19, for mixing with the polymeric material 52.

Advantageously, the porous membrane 24 can be fabricated from, for example, sintered metal, compressed wire sheets, polyester felt, glass frit, or any other material that is capable of achieving a permeability with a pressure drop of 0.498 to 13.780 kPa at a 0.152 m/sec normal gas velocity. More preferably, the porous membrane 24 is any material that is capable of achieving a permeability with a pressure drop of 0.498 to 6.890 kPa at a 0.152 m/sec normal gas velocity. Most preferably, the porous membrane 24 is any material that is capable of achieving a permeability with a pressure drop of 0.498 to 3.445 kPa at a 0.152 m/sec normal gas velocity.

In operation, fluidizing gas 28 is fed into the plenum 26 from a gas inlet line 27. A gas valve 25 regulates the amount of gas provided into the plenum 26 from fluidizing gas source 23. The gas is provided at a flowrate necessary to achieve pressure drop, of the porous membrane 24. In this way, the fluidizing gas 28 permeates through the porous membrane 24 and acts upon the microspheres 48. In other words, the fluidizing gas 28 fluidizes or reduces the bulk density of the microspheres 48, facilitating the free flow of the microspheres 48 and reducing striations in the polishing pad 4. Preferably, the fluidizing gas (e.g., argon, helium and nitrogen) does not adversely react with the microspheres 48 or polymeric materials 52.

Advantageously, in order to promote the flow of microspheres 48 from the hopper 22, the initial bulk density of the microspheres 48 should be reduced by at least 20 percent. As discussed above, "initial bulk density" is the true density of the microspheres. Throughout the specification, bulk density was measured by a temperature-controlled pycnometer, utilizing helium gas. More preferably, the bulk density of the microspheres 48 should be reduced by at least 30 percent as compared to an initial bulk density value of the microspheres. Most preferably, the bulk density of the microspheres 48 should be reduced by at least 35 percent as compared to an initial bulk density value of the microspheres. For example, where the microspheres (e.g., Expancel) has an initial bulk density value of less than or equal to 42 kg/m$^3$, then the microspheres should be fluidizes or reduced in bulk density to a value of less than or equal to 33.6 kg/m$^3$ (20 percent). More preferably, where the microspheres has an initial bulk density value of less than or equal to 42 kg/m$^3$, then the microspheres should be fluidizes or reduced in bulk density to a value of less than or equal to 29.4 kg/m$^3$ (30 percent). Most preferably, where the microspheres has an initial bulk density value of less than or equal to 42 kg/m$^3$, then the microspheres should be fluidizes or reduced in bulk density to a value of less than or equal to 27.3 kg/m$^3$ (35 percent).

Optionally, the feed line 34 may be directed into the recirculation loop 36. The recirculation loop 36 consists of a mass flow meter 38, a recirculation pump 40, a second fluidizing gas source 17, a diverting valve 15 and a return line 42. The mass flow meter 38 may be commercially obtained from, for example, Micromotion of Boulder, Colo. The recirculation pump 40 can be a diaphragm, peristaltic, sine, or lobe type pump requiring no contact lubrication. The lines 34 and 42 can comprise any non-rusting metal, plastic or polymeric material. In the absence of the recirculation loop 36, the feed line 34 may connect directly into the metering pump 46, as discussed above.

The recirculation loop 36 helps the microspheres 48 to be more uniformly distributed in hopper 22 and reduces the potential for density stratification. In other words, the recirculation loop 36, including the flow meter 38, allows for an efficient method of measuring, displaying and controlling the bulk density of the microspheres 48. Hence, the bulk density control unit 21 further comprises a recirculation loop 36 for recirculating the microspheres 48 until a desired bulk density is achieved. Advantageously, the mass flow meter 38 provides an automated method for measuring the continuous bulk density of the microspheres 48. The mass flow meter 38 may measure and display density or mass flow measurements. Alternatively, in the absence of the mass flow meter 38 or recirculation loop 36, the bulk density of the microspheres 48 can be monitored by manually, periodically sampling the fluidized microspheres 48 from delivery line 44 in conjunction with a scale (not shown).

In operation, the mass flow meter 38 measures the incoming bulk density of the microspheres 48. If the calculated bulk density is within acceptable, predetermined tolerances, then the measured microspheres 48 are directed by the diverting valve 15 to the metering pump 46 to the mixer 68 via the delivery line 44. If the calculated bulk density is too high or low, then the measured microspheres 48 are directed by the diverting valve 15 to the recirculation pump 40 back to the storage hopper 22 via the return line 42, to be fluidized again. In other words, if the bulk density is too high, then additional fluidization is conducted and, if the bulk density is too low, then fluidization is reduced and the microspheres are allowed to increase in bulk density. Additionally, if the calculated bulk density is too high, then the measured microspheres are directed by the diverting valve 15 to the recirculation pump 40 where additional fluidizing gas, provided by a second fluidizing gas source 17, is fed directly into the receiving side of the recirculation pump 40. By providing the additional fluidizing gas, the bulk density is effectively reduced at the recirculation pump 40 and the return line 42, allowing the microspheres 48 entering feed line 34 to be at a lower bulk density. Note, the microspheres 48 can be returned to the hopper 22 at any level that does not interfere with the discharge of the microspheres 48 from the discharge port 32, at the bottom of the hopper 22.

Similarly, a second helical agitator 54 is provided in the tank 50. The rotational direction and speed of the second helical agitator 54 is predetermined in order to facilitate the upward vertical movement 72 of the polymeric materials 52 along the outer wall of the tank 50 in conjunction with a downward axial flow along the shaft of the second helical agitator 54.

The polymeric materials 52 are fed through an opening at the bottom of the tank 50 that connects to the second feed line 56 of the second recirculation loop 62. The second recirculation loop 62 consists of a second feed line 56, a second metering pump 58, a diverting valve 60 and a return line 64. The second metering pump 58 can be diaphragm, peristaltic, sine, or lobe type pumps requiring no contact lubrication. The lines 56 and 64 may comprise any non-rusting metal, plastic or polymeric material.

In operation, the polymeric materials 52 and microspheres 48 are fed into the mixer 68 via a delivery system, namely, the first and second delivery lines 66, 44, respectively. After the microspheres 48 and polymeric materials 52 are properly mixed, the mixture is provided in a mold 70, which is heated and cut to form polishing pad 4. Advantageously, the mixer 68 may optionally be vented to release any excess gas used in fluidizing the microspheres.

Figure 3:
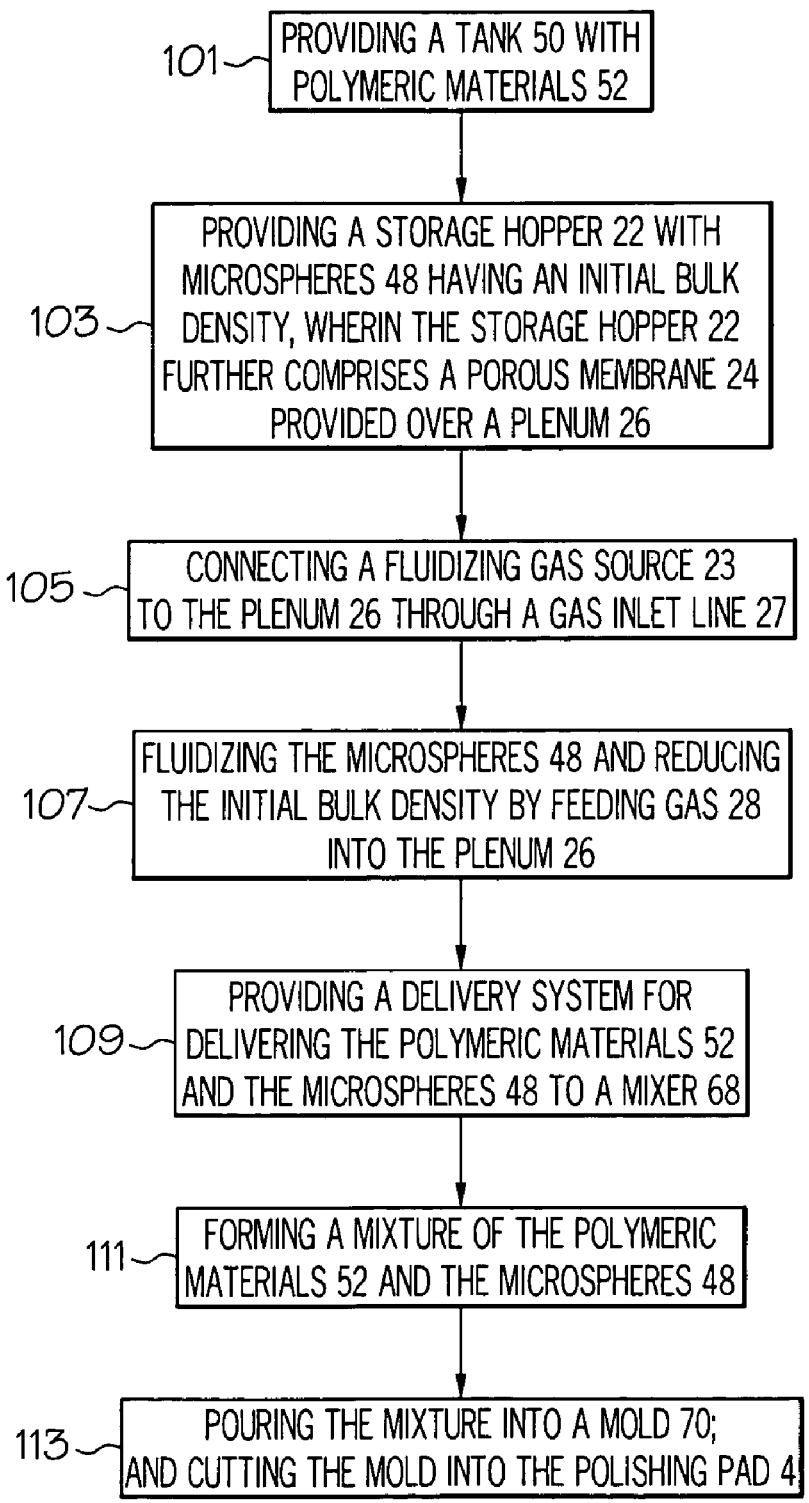
FIG. 3 illustrates a method for forming the polishing pad of the present invention.

Accordingly, as illustrated in FIG. 3, the present invention provides a method of forming a chemical mechanical polishing pad, comprising step 101 of providing a tank 50 with polymeric materials 52, and step 103 of providing a storage hopper 22 with microspheres 48 having an initial bulk density, wherein the storage hopper 22 further comprises a porous membrane 24 provided over a plenum 26. In addition, step 105 provides the step of connecting a fluidizing gas source 23 to the plenum 26 through a gas inlet line 27. Step 107 provides the step of fluidizing the microspheres 48 and reducing the initial bulk density by feeding gas 28 into the plenum 26. Step 109 provides the step of providing a delivery system for delivering the polymeric materials 52 and the microspheres 48 to a mixer 68. Step 111 provides the step of forming a mixture of the polymeric materials 52 and the microspheres 48. Step 113 provides the step of pouring the mixture into a mold 70; and cutting the mold into the polishing pad 4.

Note, although the present embodiment is described with respect to a "one-hopper, one-tank" system, the invention is not so limited. In other words, multiple hoppers and tanks for storing the microspheres and polymeric materials, respectively, may be utilized. For example, in FIG. 3, an apparatus comprising a storage hopper 22 and tanks 50, 71 are shown. Similar to tank 50, a third helical agitator 76 is provided in the tank 71. The rotational direction and speed of the third helical agitator 76 is predetermined in order to facilitate the upward vertical movement 72 of the curing agent 74 along the outer wall of the tank 71 in conjunction with a downward axial flow along the shaft of the third helical agitator 76. In this embodiment, tank 50 contains "prepolymer" materials, further discussed below.

The curing agent 74 are directed through an opening at the bottom of the tank 71 that connects to the third feed line 78 of the third recirculation loop 86. The third recirculation loop 86 consists of a diverting valve 82 and a return line 88. The third metering pump 80 can be a diaphragm, peristaltic, sine, or lobe type pump requiring no contact lubrication. The lines 78 and 88 may comprise any non-rusting metal, plastic or polymeric material. Further, a third delivery line 84 is provided that directs the curing agent 74 into the mixer 68. Note, for simplification, some of the parts present in the recirculation loop 36 for the microspheres are not present in the recirculation loops 62, 86 for the polymeric materials (e.g., mass flow meter 38). However, the recirculation loops 62, 86 may contain all or some of the features of the recirculation loop 36 for the microspheres 48.

Additionally, in an exemplary embodiment of the present invention, the polymeric material of polishing pad 4 is made from a polyisocyanate-containing material ("prepolymer"). The prepolymer is a reaction product of a polyisocyanate (e.g., diisocyanate) and a hydroxyl-containing material. The polyisocyanate may be aliphatic or aromatic. The prepolymer is then cured with a curing agent. Preferred polyisocyanates include, but are not limited to, methlene bis 4,4' cyclohexylisocyanate, cyclohexyl diisocyanate, isophorone diisocyanate, hexamethylene diisocyanate, propylene-1,2-diisocyanate, tetramethylene-1,4-diisocyanate, 1,6-hexamethylene-diisocyanate, dodecane-1,12-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethylcyclohexane, methyl cyclohexylene diisocyanate, triisocyanate of hexamethylene diisocyanate, triisocyanate of 2,4,4-trimethyl-1,6-hexane diisocyanate, uretdione of hexamethylene diisocyanate, ethylene diisocyanate, 2,2,4-trimethylhexamethylene diisocyanate, 2,4,4-trimethylhexamethylene diisocyanate, dicyclohexylmethane diisocyanate, and mixtures thereof. The preferred polyisocyanate is aliphatic. The preferred aliphatic polyisocyanate has less than 14 percent unreacted isocyanate groups.

Advantageously, the hydroxyl-containing material is a polyol. Exemplary polyols include, but are not limited to, polyether polyols, hydroxy-terminated polybutadiene (including partially/fully hydrogenated derivatives), polyester polyols, polycaprolactone polyols, polycarbonate polyols, and mixtures thereof.

In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG. Suitable polyester polyols include, but are not limited to, polyethylene adipate glycol, polybutylene adipate glycol, polyethylene propylene adipate glycol, o-phthalate-1,6-hexanediol, poly(hexamethylene adipate) glycol, and mixtures thereof. The hydrocarbon chain can have saturated or unsaturated bonds, or substituted or unsubstituted aromatic and cyclic groups. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups. Suitable polycarbonates include, but are not limited to, polyphthalate carbonate and poly(hexamethylene carbonate) glycol.

Advantageously, the curing agent is a polydiamine. Preferred polydiamines include, but are not limited to, diethyl toluene diamine ("DETDA"), 3,5-dimethylthio-2,4-toluenediamine and isomers thereof, 3,5-diethyltoluene-2,4-diamine and isomers thereof, such as 3,5-diethyltoluene-2,6-diamine, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline) ("MCDEA"), polytetramethyleneoxide-di-p-aminobenzoate, N,N'-dialkyldiamino diphenyl methane, p,p'-methylene dianiline ("MDA"), m-phenylenediamine ("MPDA"), methylene-bis 2-chloroaniline ("MBOCA"), 4,4'-methylene-bis-(2-chloroaniline) ("MOCA"), 4,4'-methylene-bis-(2,6-diethylaniline) ("MDEA"), 4,4'-methylene-bis-(2,3-dichloroaniline) ("MDCA"), 4,4'-diamino-3,3'-diethyl-5,5'-dimethyl diphenylmethane, 2,2',3,3'-tetrachloro diamino diphenylmethane, trimethylene glycol di-p-aminobenzoate, and mixtures thereof. Preferably, the curing agent of the present invention includes 3,5-dimethylthio-2,4-toluenediamine and isomers thereof. Suitable polyamine curatives include both primary and secondary amines.

In addition, other curatives such as, a diol, triol, tetraol, or hydroxy-terminated curative may be added to the aforementioned polyurethane composition. Suitable diol, triol, and tetraol groups include ethylene glycol, diethylene glycol, polyethylene glycol, propylene glycol, polypropylene glycol, lower molecular weight polytetramethylene ether glycol, 1,3-bis(2-hydroxyethoxy) benzene, 1,3-bis-[2-(2-hydroxyethoxy) ethoxy] benzene, 1,3-bis-{2-[2-(2-hydroxyethoxy) ethoxy]ethoxy}benzene, 1,4-butanediol, 1,5-pentanediol, 1,6-hexanediol, resorcinol-di-(beta-hydroxyethyl) ether, hydroquinone-di-(beta-hydroxyethyl) ether, and mixtures thereof. Preferred hydroxy-terminated curatives include 1,3-bis(2-hydroxyethoxy)benzene, 1,3-bis-[2-(2-hydroxyethoxy) ethoxy]benzene, 1,3-bis-{2-[2-(2-hydroxyethoxy) ethoxy]ethoxy}benzene, 1,4-butanediol, and mixtures thereof. Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a preferred embodiment of the invention, the polymeric material 52 may be formed of, for example, polyurethanes, both thermoset and thermoplastic, polycarbonates, polyesters, silicones, polyimides and polysulfone. Other example materials for polymeric material 52 include, but are not limited to, polyvinyl chloride, polyacrylonitrile, polymethylmethacrylate, polyvinylidene fluoride, polyethylene terephthalate, polyetheretherketone, polyetherketone, polyetherimide, ethylvinyl acetate, polyvinyl butyrate, polyvinyl acetate, acrylonitrile butadiene styrene, fluorinated ethylene propylene and perfluoralkoxy polymers, and combinations thereof. A preferred polymeric material 52 is polyurethane.

Figure 4:
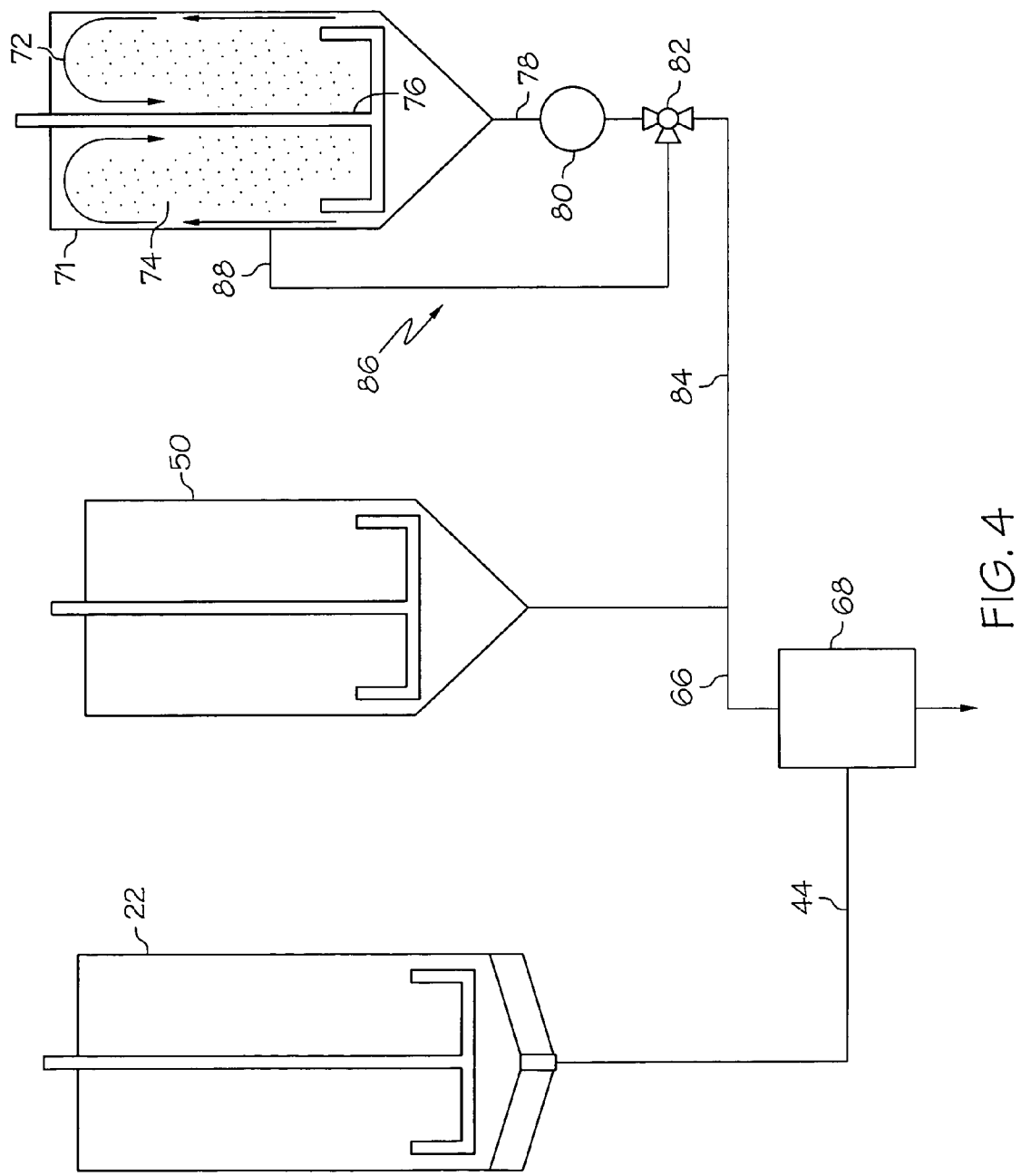
FIG. 4 illustrates another embodiment of an apparatus for forming the polishing pad of the present invention.
Figure 5:
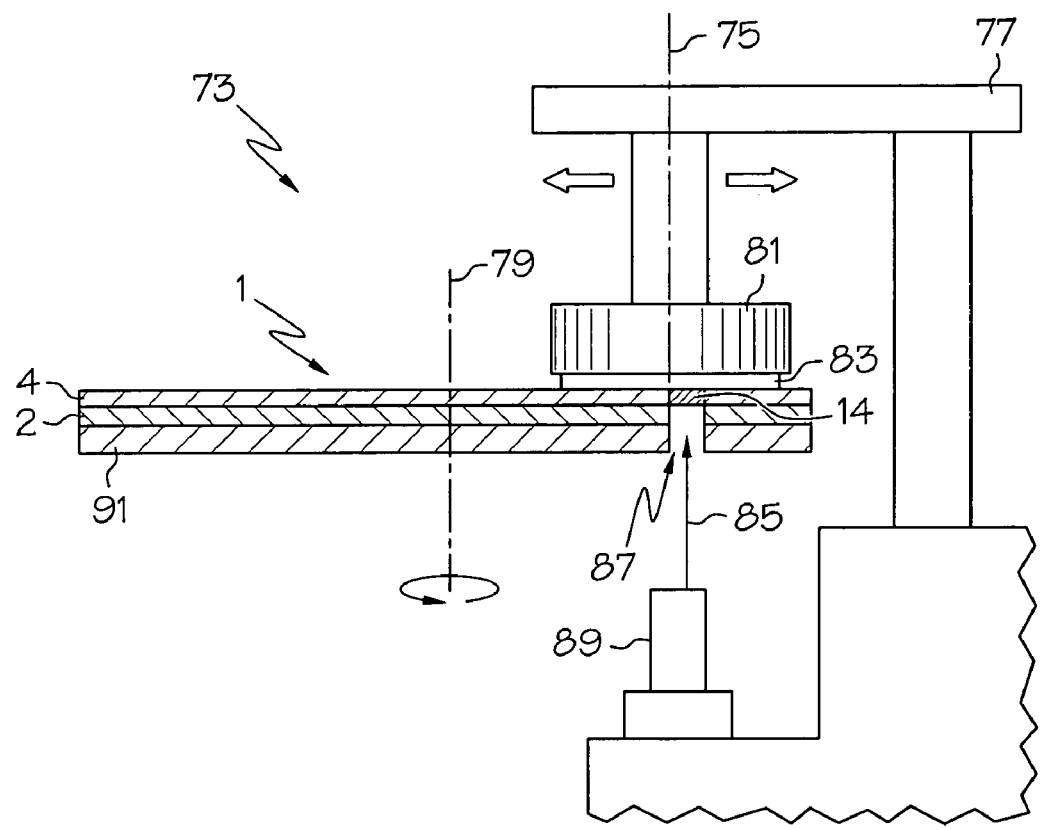
FIG. 5 illustrates a CMP system utilizing the polishing pad of the present invention.

Referring now to FIG. 4, a CMP apparatus 73 utilizing the striation reduced polishing pad of the present invention is provided. Apparatus 73 includes a wafer carrier 81 for holding or pressing the semiconductor wafer 83 against the polishing platen 91. The polishing platen 91 is provided with a stacked polishing pad 1, including striation reduced polishing pad 4, of the present invention. As discussed above, pad 1 has a bottom layer 2 that interfaces with the surface of the platen 91, and a polishing pad 4 that is used in conjunction with a chemical polishing slurry to polish the wafer 83. Note, although not pictured, any means for providing a polishing fluid or slurry can be utilized with the present apparatus. The platen 91 is usually rotated about its central axis 79. In addition, the wafer carrier 81 is usually rotated about its central axis 75, and translated across the surface of the platen 91 via a translation arm 77. Note, although a single wafer carrier is shown in FIG. 4, CMP apparatuses may have more than one spaced circumferentially around the polishing platen. In addition, a transparent hole 87 is provided in the platen 91 and overlies the window 14 of pad 1. Accordingly, transparent hole 32 provides access to the surface of the wafer 83, via window 14, during polishing of the wafer 83 for accurate end-point detection. Namely, a laser spectrophotometer 89 is provided below the platen 91 that projects a laser beam 85 to pass and return through the transparent hole 87 and window 14 for accurate end-point detection during polishing of the wafer 83.

Accordingly, the present invention provides a method of forming a chemical mechanical polishing pad, comprising providing a tank with polymeric materials and providing a storage hopper with microspheres having an initial bulk density, wherein the storage hopper further comprises a porous membrane provided over a plenum. The method further provides the steps of connecting a fluidizing gas source to the plenum through a gas inlet line and fluidizing the microspheres and reducing the initial bulk density by feeding gas into the plenum. In addition, the method further provides the steps of providing a delivery system for delivering the polymeric materials and the microspheres to a mixer, forming a mixture of the polymeric materials and the microspheres, pouring the mixture into a mold to form a molded product and cutting the molded product into the polishing pad.

What is claimed is:

1. A method of forming a chemical mechanical polishing pad, comprising:
   providing a tank with polymeric materials;
   providing a storage hopper with hollow polymeric microspheres having an initial bulk density, wherein the storage hopper further comprises a helical agitator and a porous membrane provided over a plenum;
   providing a recirculation loop for recirculating the hollow polymeric microspheres and controlling the bulk density of the hollow polymeric microspheres, wherein the recirculation loop has a mass flow sensor for measuring a continuous bulk density of the hollow polymeric microspheres passing therethrough,
   connecting a fluidizing gas source to the plenum through a gas inlet line;
   fluidizing the hollow polymeric microspheres by feeding a fluidizing gas from the fluidizing gas source into the plenum through the porous membrane into the storage hopper and thereby reducing the bulk density of the hollow polymeric microspheres below the initial bulk density;
   providing a delivery system for delivering the polymeric materials and the hollow polymeric microspheres having a bulk density below the initial bulk density to a mixer;
   forming a mixture of the polymeric materials and the hollow polymeric microspheres;
   pouring the mixture into a mold to a form a molded product; and
   cutting the molded product into the polishing pad.

2. The method of claim 1 wherein the step of fluidizing the hollow polymeric microspheres reduces the bulk density of the hollow polymeric microspheres by at least 20 percent.

3. The method of claim 1 wherein the porous membrane achieves permeability with a pressure drop of 0.498 to 13.780 kPa at a 0.152 m/sec normal gas velocity.

4. The method of claim 1 further comprising the step of venting the mixer before pouring the mixture.

5. The method of claim 1 wherein the polymeric material comprises, polyurethanes, polycarbonates, polyesters, silicones, polyimides, polysulfone, polyvinyl chloride, polyacrylonitrile, polymethylmethacrylate, polyvinylidene fluoride, polyethylene terephthalate, polyetheretherketone, polyetherketone, polyetherimide, ethylvinyl acetate, polyvinyl butyrate, polyvinyl acetate, acrylonitrile butadiene styrene, fluorinated ethylene propylene and perfluoralkoxy polymers, and combinations thereof.

6. The method of claim 1, wherein the hollow polymeric microspheres comprise a copolymer of acrylonitrile and vinylidene chloride.

* * * * *